United States Patent
Liu et al.

(10) Patent No.: US 10,419,668 B2
(45) Date of Patent: Sep. 17, 2019

(54) PORTABLE DEVICE WITH ADAPTIVE PANORAMIC IMAGE PROCESSOR

(71) Applicant: MEDIATEK INC., Hsin-Chu (TW)

(72) Inventors: Tsu-Ming Liu, Hsinchu (TW);
Kui-Chang Tseng, Kaohsiung (TW);
Chi-Cheng Ju, Hsinchu (TW);
Chih-Ming Wang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 225 days.

(21) Appl. No.: 15/310,248

(22) PCT Filed: Jul. 28, 2015

(86) PCT No.: PCT/CN2015/085292
§ 371 (c)(1),
(2) Date: Nov. 10, 2016

(87) PCT Pub. No.: WO2016/015623
PCT Pub. Date: Feb. 4, 2016

(65) Prior Publication Data
US 2017/0272649 A1    Sep. 21, 2017

Related U.S. Application Data

(60) Provisional application No. 62/029,657, filed on Jul. 28, 2014.

(51) Int. Cl.
*G06K 9/00* (2006.01)
*H04N 5/232* (2006.01)
(Continued)

(52) U.S. Cl.
CPC ......... *H04N 5/23238* (2013.01); *G06F 3/016* (2013.01); *G06F 3/0488* (2013.01);
(Continued)

(58) Field of Classification Search
CPC ........... H04N 5/23238; H04N 5/23293; H04N 5/2353; H04N 5/2258; H04N 5/23212;
(Continued)

(56) References Cited

U.S. PATENT DOCUMENTS 6,639,596 B1 * 10/2003 Shum .................. G06K 9/209
345/427
8,355,042 B2    1/2013 Lablans
(Continued)

FOREIGN PATENT DOCUMENTS

| CN | 101146231 A | 3/2008 |
|---|---|---|
| CN | 101252687 A | 8/2008 |

(Continued)

OTHER PUBLICATIONS

International Search Report dated Sep. 24, 2015, issued in application No. PCT/CN2015/085298.
(Continued)

*Primary Examiner* — Howard D Brown, Jr.
(74) *Attorney, Agent, or Firm* — McClure, Qualey & Rodack, LLP

(57) ABSTRACT

A portable device has an adaptive panoramic image processor. The portable device further has a plurality of image sensors having overlapping fields of view and an input device receiving a trigger signal that triggers the plurality of image sensors to capture a plurality of images. The adaptive panoramic image processor of the portable device processes the images to form a panorama based on side information about the portable device.

24 Claims, 14 Drawing Sheets

(51) Int. Cl.
| | | |
|---|---|---|
| G06T 3/40 | (2006.01) | |
| H04N 5/262 | (2006.01) | |
| G06T 7/70 | (2017.01) | |
| G06F 3/01 | (2006.01) | |
| G06F 3/0488 | (2013.01) | |
| G06F 3/16 | (2006.01) | |
| H04N 5/04 | (2006.01) | |
| H04N 5/247 | (2006.01) | |
| H04N 7/01 | (2006.01) | |
| H04N 7/14 | (2006.01) | |
| H04N 7/15 | (2006.01) | |
| G06K 9/62 | (2006.01) | |
| H04N 5/225 | (2006.01) | |
| H04N 5/235 | (2006.01) | |
| H04N 7/18 | (2006.01) | |

(52) U.S. Cl.
CPC ........... *G06F 3/16* (2013.01); *G06K 9/00255* (2013.01); *G06K 9/6267* (2013.01); *G06T 3/4038* (2013.01); *G06T 7/70* (2017.01); *H04N 5/04* (2013.01); *H04N 5/2258* (2013.01); *H04N 5/2353* (2013.01); *H04N 5/23212* (2013.01); *H04N 5/23216* (2013.01); *H04N 5/23229* (2013.01); *H04N 5/23241* (2013.01); *H04N 5/23293* (2013.01); *H04N 5/247* (2013.01); *H04N 5/2624* (2013.01); *H04N 7/0127* (2013.01); *H04N 7/147* (2013.01); *H04N 7/15* (2013.01); *H04N 7/188* (2013.01)

(58) Field of Classification Search
CPC ............ H04N 7/188; H04N 7/15; H04N 5/04; H04N 5/247; H04N 7/0127; H04N 7/147; H04N 5/2624; H04N 5/23241; H04N 5/23229; H04N 5/23216; G06F 3/16; G06F 3/016; G06F 3/0488; G06K 9/6267; G06K 9/00255; G06T 3/4038; G06T 7/70; H05K 999/99
See application file for complete search history.

(56) References Cited

U.S. PATENT DOCUMENTS

| | | | | |
|---|---|---|---|---|
| 8,717,405 | B2* | 5/2014 | Li | H04N 7/15 348/14.08 |
| 10,021,295 | B1* | 7/2018 | Baldwin | H04N 5/232935 |
| 2003/0091226 | A1* | 5/2003 | Cahill | G06K 9/00201 382/154 |
| 2009/0290033 | A1* | 11/2009 | Jones | G08B 13/19693 348/218.1 |
| 2010/0097443 | A1* | 4/2010 | Lablans | G03B 37/00 348/36 |
| 2011/0110605 | A1* | 5/2011 | Cheong | H04N 5/23238 382/284 |
| 2011/0292233 | A1* | 12/2011 | Chu | H04N 5/2253 348/222.1 |
| 2013/0346916 | A1* | 12/2013 | Williamson | G01C 21/3647 715/800 |
| 2014/0118487 | A1* | 5/2014 | Shikata | H04N 5/232 348/36 |
| 2015/0139524 | A1* | 5/2015 | Choi | H04N 5/23238 382/132 |
| 2015/0278995 | A1* | 10/2015 | Nakahata | G06T 3/4038 382/275 |
| 2016/0088222 | A1* | 3/2016 | Jenny | H04N 5/23238 348/36 |
| 2017/0150212 | A1* | 5/2017 | Wang | H04N 21/44016 |
| 2017/0272649 | A1* | 9/2017 | Liu | H04N 5/23238 |
| 2017/0310936 | A1* | 10/2017 | Nordin | H04N 7/181 |

FOREIGN PATENT DOCUMENTS

| | | |
|---|---|---|
| CN | 101378559 | 3/2009 |
| CN | 101487838 A | 7/2009 |
| CN | 101771830 | 7/2010 |
| CN | 101872113 A | 10/2010 |
| CN | 101902571 | 12/2010 |
| CN | 102124320 A | 7/2011 |
| CN | 102216959 | 10/2011 |
| CN | 102263926 | 11/2011 |
| CN | 102521814 A | 6/2012 |
| CN | 102216959 B | 8/2015 |
| EP | 1 848 202 A3 | 12/2007 |
| EP | 2 242 252 A3 | 11/2010 |
| WO | WO 2013/162585 | 10/2013 |
| WO | 2013/186804 A1 | 12/2013 |

OTHER PUBLICATIONS

International Search Report dated Sep. 25, 2015, issued in application No. PCT/CN2015/085292.

* cited by examiner

PORTABLE DEVICE WITH ADAPTIVE PANORAMIC IMAGE PROCESSOR

CROSS REFERENCE TO RELATED APPLICATIONS

This application claims the benefit of U.S. Provisional Application No. 62/029,657 filed Jul. 28, 2014, the entirety of which is/are incorporated by reference herein.

TECHNICAL FIELD

The present invention relates to a portable device generating a panoramic photo/video file by an adaptive panoramic image processor.

BACKGROUND

Traditionally, a panorama photo is generated by repeatedly using a single particular camera (e.g. the rear camera) of a smartphone to capture multiple photographs. It may take a long time to capture all of the photographs by the single camera and is very inconvenient.

A portable device that can generate a panoramic photo or a panoramic video by one trigger signal but not crashing the system is called for.

SUMMARY

A portable device in accordance with an exemplary embodiment of the disclosure is shown, which comprises a plurality of image sensors with overlapping sensing areas, an input device receiving a trigger signal that triggers the plurality of image sensors to capture a plurality of images, and an adaptive panoramic image processor processing the images to form a panorama based on side information about the portable.

The side information may be collected from component bandwidth (e.g. dynamic random access memory bandwidth), a battery, a panel, an object distance estimator (e.g. a proximity sensor or the image sensor(s)), a thermal sensor, an accelerometer, or a gyroscope.

In some other exemplary embodiments, the side information may show image signal processing features of the images.

The portable device may further comprise an adaptive panoramic display and the input device may be a touch panel. The adaptive panoramic display processor may drive the touch panel for panorama display based on content classification of display data for a trade-off between display quality and system-resource loading. In another exemplary embodiment, the adaptive panoramic display processor may drive the touch panel for panorama display based on position and timing detected by the positioning module.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION

The following description shows exemplary embodiments of carrying out the invention. This description is made for the purpose of illustrating the general principles of the invention and should not be taken in a limiting sense. The scope of the invention is best determined by reference to the appended claims.

In accordance with an exemplary embodiment of the disclosure, a portable device capable of generating a panoramic photo or video file with an adaptive panoramic processing algorithm is shown, which comprises a plurality of image sensors with overlapping sensing areas, an input device receiving a trigger signal that triggers the plurality of image sensors to capture a plurality of images, and an adaptive panoramic image processor processing (e.g. standardizing) the images to form a panorama based on side information about the portable device for a trade-off between panorama quality and system-resource loading. The panoramic experience established in accordance the panoramic photo or video file is in a field of view over 180 degrees. In the following exemplary embodiments, a 720° field of view is discussed. However, it is not intended to limit the panoramic experience to 720° field of view. In some other embodiments, the image sensors mounted on a portable device for generating a panoramic photo or video file may cover a panoramic view field other than 720°.

Figure 1:
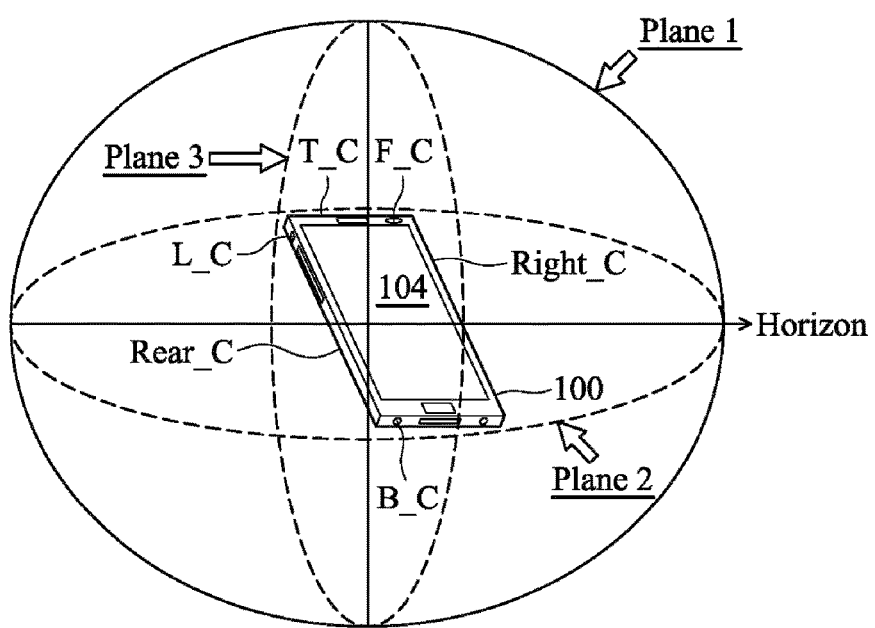
FIG. 1 shows a portable device 100 (e.g., a smartphone) with a 720° field of view.

FIG. 1 shows a portable device 100 (e.g., a smartphone) with a 720° field of view. The 720° field of view may be defined with respect to a plane (e.g., plane1, a plane2, plane3, any other plane, or combination thereof). In this embodiment, the 720° field may refer to two 360° fields, each of which corresponds to one plane. It may be assumed that the portable device 100 is at the center of the three planes. Multiple image sensors may be arranged on the portable device 100 with respect to the planes.

Figure 2:
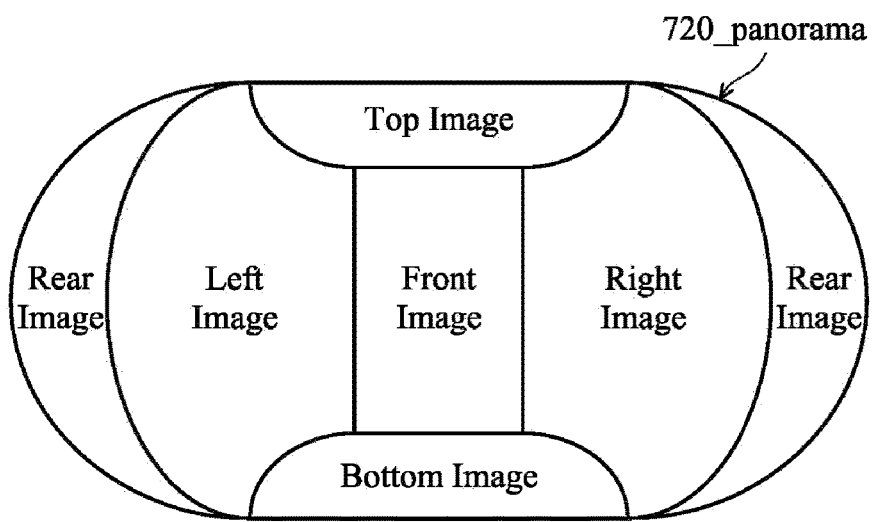
FIG. 2 shows an expanded view of a 720° panorama 720_panorama formed by images captured by the six cameras T_C, B_C, L_C, Right_C, F_C and Rear_C.

In an exemplary embodiment, there may be at least some of a top camera T_C at the top side of the portable device 100, a bottom camera B_C at the bottom side of the portable device 100, a left camera L_C at the left side of the portable device 100, a right camera Right_C at the right side of the portable device 100, a front camera F_C at the front side of the portable device 100, and a rear camera Rear_C at the rear side of the portable device 100. At least some of these cameras T_C, B_C, L_C, Right_C, F_C and Rear_C have overlapping fields of view. For example, two adjacent cameras form an overlapping image-capturing region. The portable device 100 may have a display unit 104. When a user operates a trigger function (for example, by a single touch on a shutter/trigger icon displayed on a touch panel, or by a single press on a shutter/trigger button), at least some of these six cameras T_C, B_C, L_C, Right_C, F_C and Rear_C may be triggered and thereby to capture images or to record videos in a panoramic view (e.g., 720° field of view or any other field of view for representing a panoramic view) around the portable device 100. Thus, a panoramic photo file or a panoramic video file is generated. FIG. 2 shows an embodiment of an expanded view of a 720° panorama 720_panorama formed by images captured by the six cameras T_C, B_C, L_C, Right_C, F_C and Rear_C. As shown, the 720° panorama 720_panorama may be formed from multiple images, including a front image captured by the front camera F_C, a rear image (represented on the left side and the right side of the expanded view of the 720° panorama 720_panorama) captured by the rear camera Rear_C, a left image captured by the left camera L_C, a right image captured by the right camera Right_C, a top image captured by the top camera T_C, and a bottom image captured by the bottom camera B_C.

Figure 3:
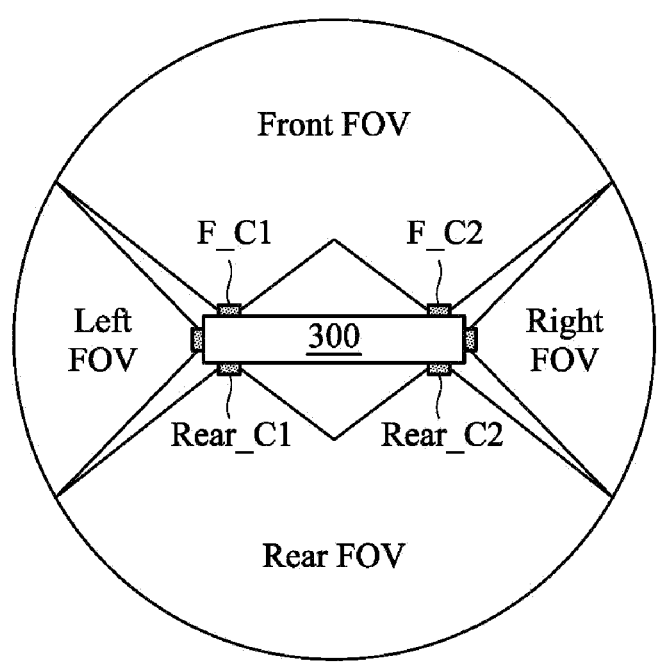
FIG. 3 shows how to cover a 360° sensing area around a portable device 300 in accordance with another exemplary embodiment of the disclosure.

There are a variety of ways to assemble cameras on a portable device. For example, FIG. 3 shows an embodiment about how to cover a 360° sensing area around a portable device 300 in accordance with another exemplary embodiment of the disclosure. On the front side of the portable device 300, there may be two cameras F_C1 and F_C2 rather than the single camera F_C assembled on the portable device 100. Thus, the front field of view may be effectively expanded. Similarly, there may be two cameras Rear_C1 and Rear_C2 on the rear side of the portable device 300 and the rear field of view is effectively expanded. It is not intended to limit the camera arrangement to those shown in FIG. 1 and FIG. 3. Any portable device equipped with at least two cameras, which correspond to an overlapping image-capturing region, is suitable for using the adaptive panorama image processor of the disclosure.

Figure 4:
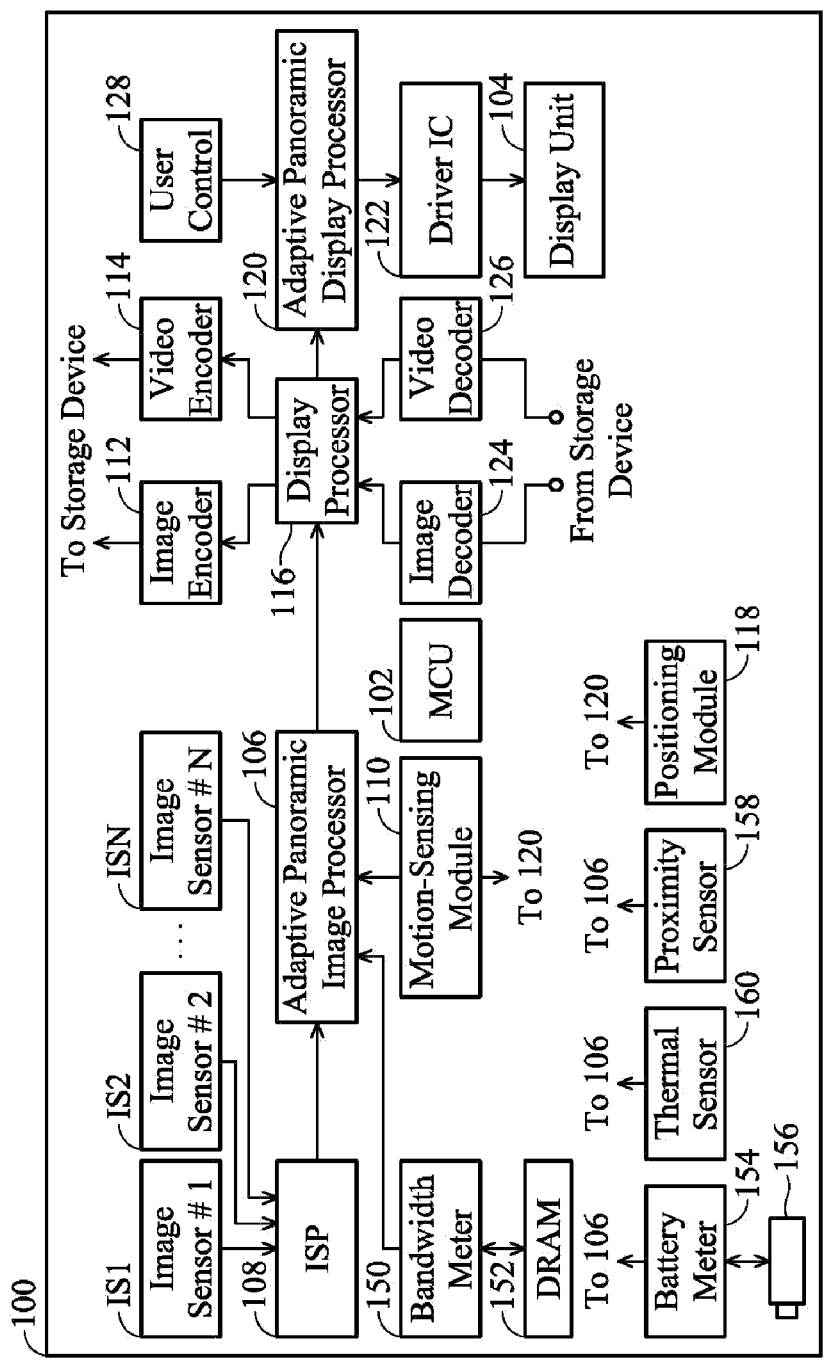
FIG. 4 is a block diagram depicting the portable device 100 in detail.

FIG. 4 is a block diagram depicting the portable device 100 in detail. The blocks shown in FIG. 4 may be centrally controlled by a microcontroller 102 of the portable device 100. The portable device 100 comprises a plurality of image sensors IS1, IS2 . . . ISN (i.e. cameras T_C, B_C, L_C, Right_C, F_C and Rear_C of FIG. 1).

As shown, an adaptive panoramic image processor 106 is coupled to the image signal processor 108 of the image sensors IS1 . . . ISN to process (e.g. standardize) the N images to form a panorama. For example, the adaptive panoramic image processor 106 may standardize the configurations of the N images, such that the configurations of the N images may be the same and the panorama may be formed based on the standardized N images. A motion-sensing module 110 may be coupled to the adaptive panoramic image processor 106. When the images are being captured, the motion-sensing module 110 may collect motion information about the portable device 100, e.g., posture or movement of the portable device 100, to further process the N images. The adaptive panoramic image processor 106 is coupled to an image encoder 112 and a video encoder 114 via a display processor 116 of the portable device 100. When the image sensors IS1 to ISN take one photo shoot controlled by the trigger function, a panoramic photo file is generated by the image encoder 112. When the image sensors IS1 to ISN are triggered for recording videos, a series of panoramas may be encoded as a panoramic video file by the video encoder 114. The position and height information about the portable device 100 detected by a positioning module 118 of the portable device 100 may be packed into the panoramic photo file or the panoramic video file, such that according to the position and height information about the portable device 100, the panoramic photo/video file may be integrated with another panoramic photo/video file generated by a nearby portable device. Thus, a panorama photo/video with a wide view field may be formed. The portable device 100 further comprises an adaptive panoramic display processor 120. The adaptive panoramic display processor 120 may provide the panorama (or the panoramic video) to a driver IC 122, such that the driver IC 122 may drive the display unit 104 to display the panorama (or the panoramic video).

In some exemplary embodiments, the panorama or the panoramic video displayed on the display unit 104 may be retrieved from a storage device rather than being directly transmitted from the image sensors IS1 to ISN. The panorama and the panoramic video retrieved from a storage device may be decoded by the image decoder 124 and video decoder 126, respectively, and then, through the display processor 116, the adaptive panoramic display processor 120 is operated to provide the panorama and the panoramic video, such that the driver IC 122 drives the display unit 104 to display the panorama or the panoramic video. A panoramic view window (for choosing the display image on the display unit 104) on the panorama or the panoramic video may be adjusted via a user control 128.

The adaptive panoramic image processor 106 is adaptive to side information about the portable device 100 for a trade-off between panorama quality and system-resource (e.g. system loading or power consumption). In FIG. 4, the portable device 100 may further comprise a bandwidth meter 150 measuring the bandwidth of a DRAM 152 of the portable device 100, a battery meter 154 measuring the battery level of a battery 156 of the portable device 100, a proximity sensor 158 for sensing the distance between the portable device 100 and a detected object, a thermal sensor 160, or combination thereof. The motion sensing module 110 may include an accelerometer or a gyroscope. The side information, which is utilized to decide the algorithm applied to the adaptive panoramic image processor 106, may be provided by the bandwidth meter 150, the battery meter 154, the proximity sensor 158, the thermal sensor 160, or at least one of the accelerometer and the gyroscope of the motion sensing module 110. In other exemplary embodiments, image signal processing features (e.g., focus levels, exposure levels or ISO values) of the images captured by the image sensors IS1 to ISN may be provided by the image signal processor 108 and fed to the adaptive panoramic image processor 106 as the side information for deciding the algorithm applied to the adaptive panoramic image processor 106. In an exemplary embodiment, the panel type (e.g., LCD or LED) of the display unit 104 or any other type of information about the display unit 104 may be regarded as the side information deciding the algorithm with a suitable complexity applied to the adaptive panoramic image processor 106.

Furthermore, the adaptive panoramic display processor 120 may provide content to the display unit 104 for panorama display based on content classification of display data (e.g. decoded by the image/video decoder 124/126), for a trade-off between display quality and system-resource (e.g. system loading or power consumption). The content classification decides the algorithm applied to the adaptive panoramic display processor 120. In another exemplary embodiment, the adaptive panoramic display processor 120 may drive the display unit 104 for panorama display based on position or timing detected by the positioning module 118.

There are several algorithms with different complexity for operating the adaptive panoramic image processor 106. The more complex algorithm may result in a better panorama quality but more power consumption.

Figure 5A:
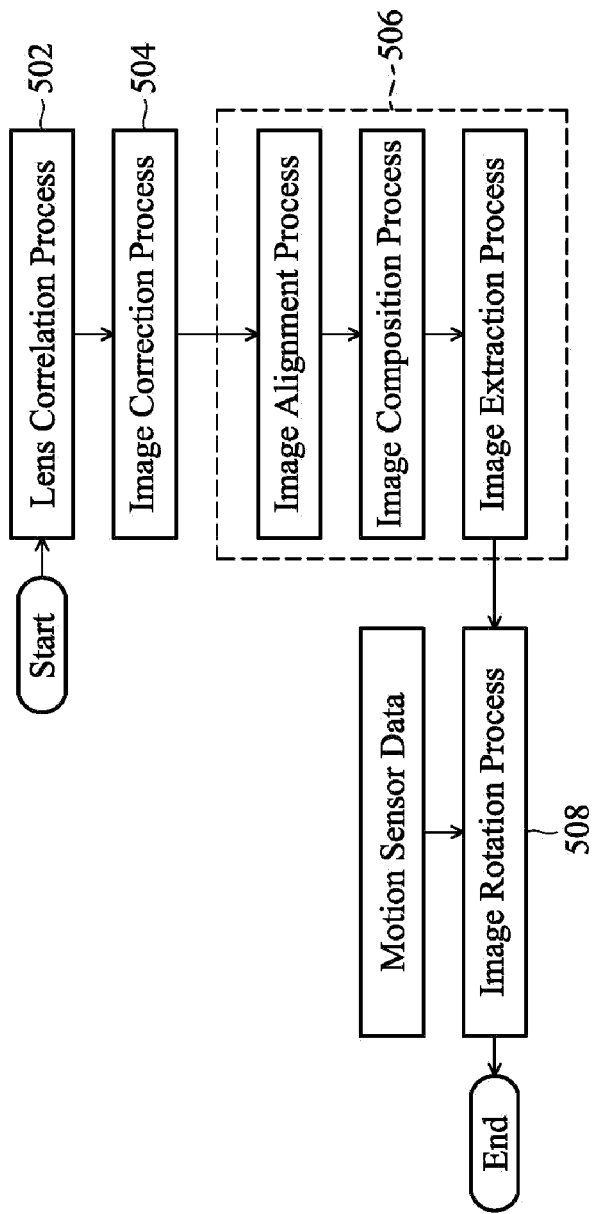
FIG. 5A is a flowchart depicting the operations of the adaptive panoramic image processor 106 in accordance with an exemplary embodiment of the disclosure.
Figure 5B:
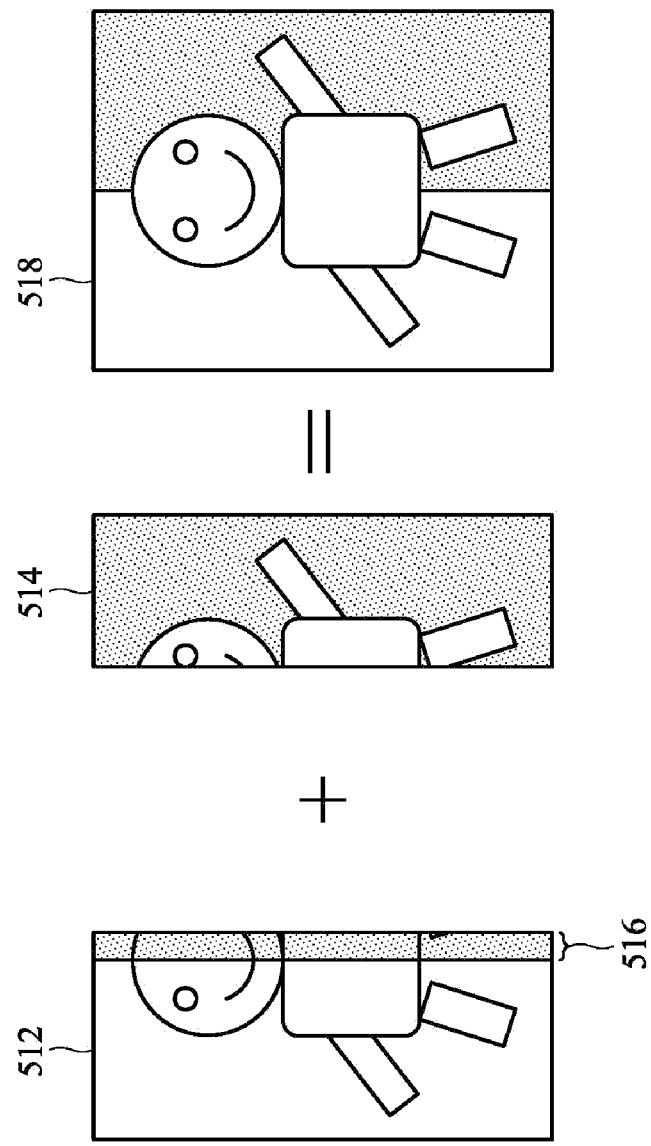
FIG. 5B shows an example for discussion of the image alignment, composition and extraction of step 506.

FIG. 5A is an embodiment of a flowchart depicting the operations for generating a panoramic photo/video file performed by, but not limitation, the adaptive panoramic image processor 106 in accordance with an exemplary embodiment of the disclosure. Step 502 may correlate the differences between the lens of the image sensors IS1 to ISN. In some embodiments, a mapping table may be established for the lens correlation. In step S504, an image correction process may be performed to correct effect on the photos/videos captured by the image sensors IS1 to ISN due to different configurations among the image sensors IS1 to ISN. Such configurations may include ISO values, resolutions, frame rates, other configurations which may affect the photos/videos captured by the image sensors IS1 to ISN, or combination. In step S506, image alignment, image composition or image extraction may be performed to align the orientation of different images, compose the images to a single image or extract the panoramic region. In step 508, the image rotation process may be performed to rotate the panoramic image in accordance with motion sensor data from the motion-sensing module 110. FIG. 5B shows an example for discussion of the image alignment, composition and extraction of step 506. The two images 512 and 514 captured by two different cameras have an overlapped region 516. After the image alignment, composition and extraction of step 506, a composed image 518 (e.g. a panoramic image) is generated. The changes on the steps 502 to 508 may result in algorithms with different complexity. For example, it is shown in TABLE 1 that five algorithms A1 to A5 in the increasing order of calculation complexity and power consumption and decreasing order of panorama quality may be provided.

TABLE 1

| Type of Algorithm | Complexity (the higher grade the higher complexity) | Power Consumption (the higher grade the more power consumption) | Panorama Quality (the higher grade the better panorama quality) |
| --- | --- | --- | --- |
| Algorithm A1 | Grade 5 Complexity | Grade 5 Power Consumption | Grade 5 Panorama Quality |
| Algorithm A2 | Grade 4 Complexity | Grade 4 Power Consumption | Grade 4 Panorama Quality |
| Algorithm A3 | Grade 3 Complexity | Grade 3 Power Consumption | Grade 3 Panorama Quality |
| Algorithm A4 | Grade 2 Complexity | Grade 2 Power Consumption | Grade 2 Panorama Quality |
| Algorithm A5 | Grade 1 Complexity | Grade1 Power Consumption | Grade 1 Panorama Quality |

The more design in any or a combination of the steps S502-S508 (e.g. a more complex algorithm for the adaptive panoramic image processor 106) may consume more power consumption but get a better panorama quality. In some other embodiments, algorithms may be provided with combinations of different grades of properties (e.g. complexity, power consumption, panorama quality, any other property, or combination thereof), which should not be limited in this disclosure.

As for the adaptive panoramic display processor 120, the changes on the operating steps of the adaptive panoramic display processor 120 may result in algorithms with different complexity. For example, five algorithms A1' to A5' in the increasing order of calculation complexity and power consumption and decreasing order of display quality may be provided. The adaptive panoramic display processor 120 may select a suitable algorithm based on the content classification of display data. In some other embodiments, algorithms may be provided with any combination of calculation complexity, power consumption and display quality for the adaptive panoramic display processor 120 to select a suitable one based on the content classification of display data, which should not be limited in this disclosure.

Figure 6A:
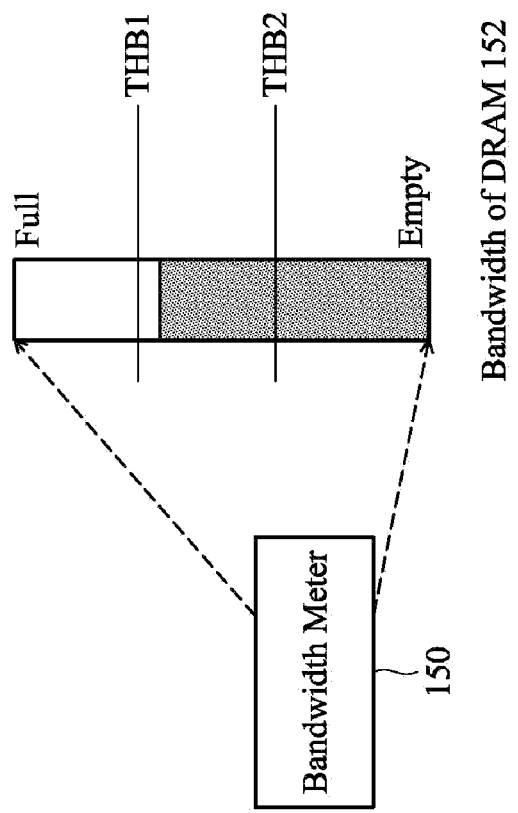
FIG. 6A shows that the bandwidth of the DRAM 152 may be measured by the bandwidth meter 150 to be compared with threshold bandwidth THR1 or THR2.
Figure 6B:
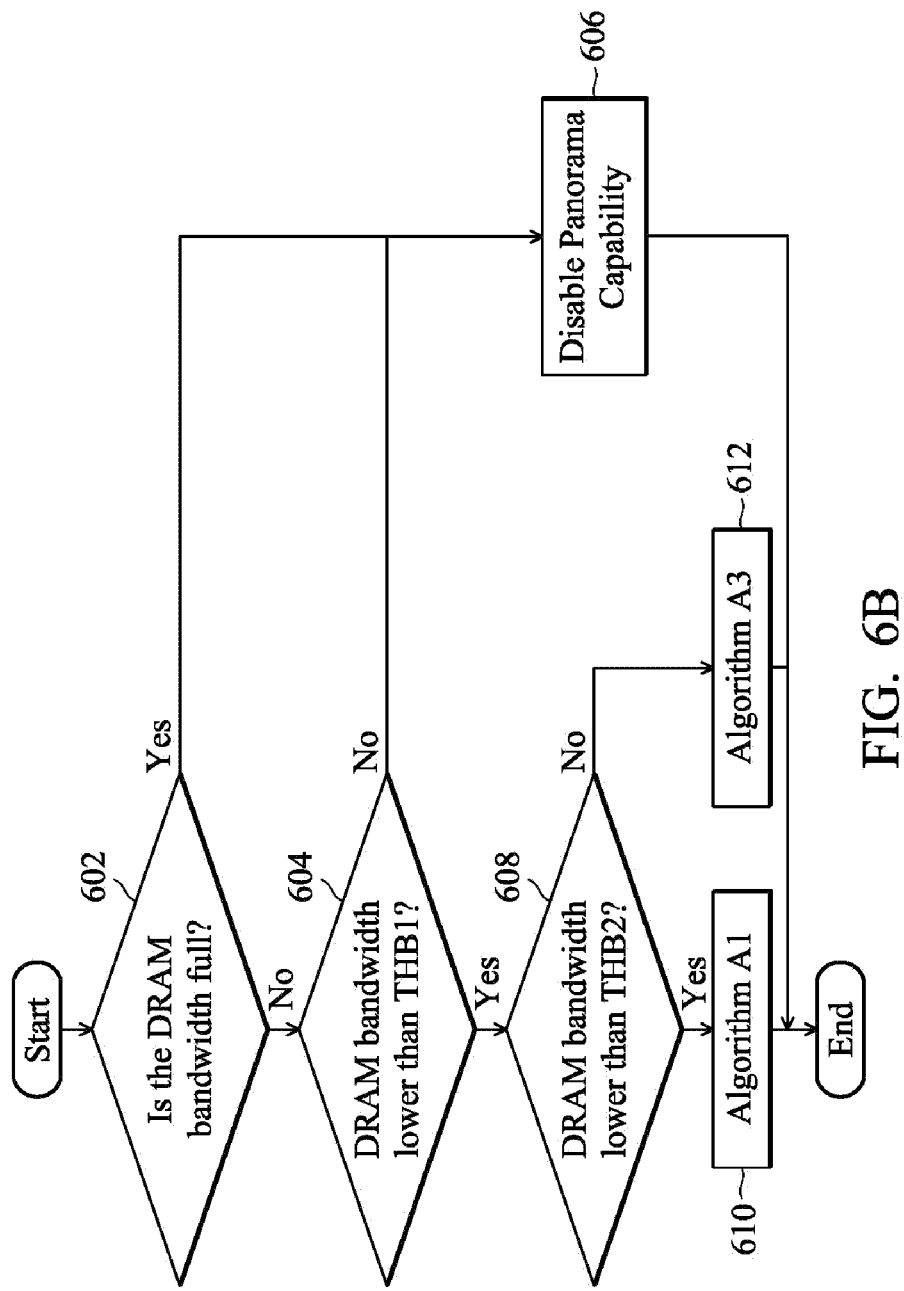
FIG. 6B is a flowchart depicting how to choose the algorithm applied to the adaptive panoramic image processor 106 based on the bandwidth of the DRAM 152.

FIG. 6A shows an embodiment that the bandwidth of the DRAM 152 may be measured by the bandwidth meter 150 to be compared with threshold bandwidth THB1 or THB2. FIG. 6B is a flowchart depicting how to choose the algorithm applied to the adaptive panoramic image processor 106 based on the bandwidth of the DRAM 152. When step 602 determines that the bandwidth of the DRAM 152 is full or step 604 determines that the DRAM bandwidth is not full and not lower than the threshold bandwidth THB1, step 606 is performed to disable the panorama capability of the adaptive panoramic image processor 106. When it is determined in step 608 that the DRAM bandwidth lower than the threshold bandwidth THB1 is also lower than the threshold bandwidth THB2, step 610 is performed to apply a more complex algorithm A1 to the adaptive panoramic image processor 106 in comparison with the algorithm A3, which is adopted in step 612 when the DRAM bandwidth is lower than the threshold bandwidth THB1 but not lower than the threshold bandwidth THB2. In this manner, the adaptive panoramic image processor 106 provides improved panorama quality (by the more complex algorithm) when the bandwidth of the DRAM 152 is lower than a threshold bandwidth. In some other embodiments, the operations or the order of steps 602-612 may be adjusted, which should not be limited in this disclosure. Furthermore, the bandwidth of other components (not limit to the DRAM 152) of the portable device 100 may be regarded as the side information for choosing the algorithm applied to the adaptive panoramic image processor 106. The wider available bandwidth may correspond to the more complex algorithm for the better panorama quality.

Figure 7A:
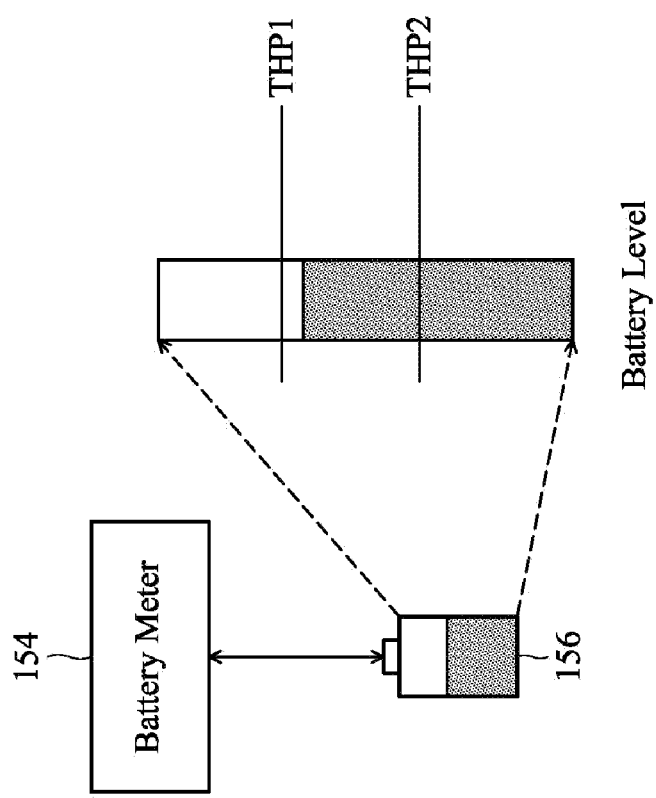
FIG. 7A shows that the battery level of the battery 156 may be measured by the battery meter 154 to be compared with threshold values THP1 or THP2.
Figure 7B:
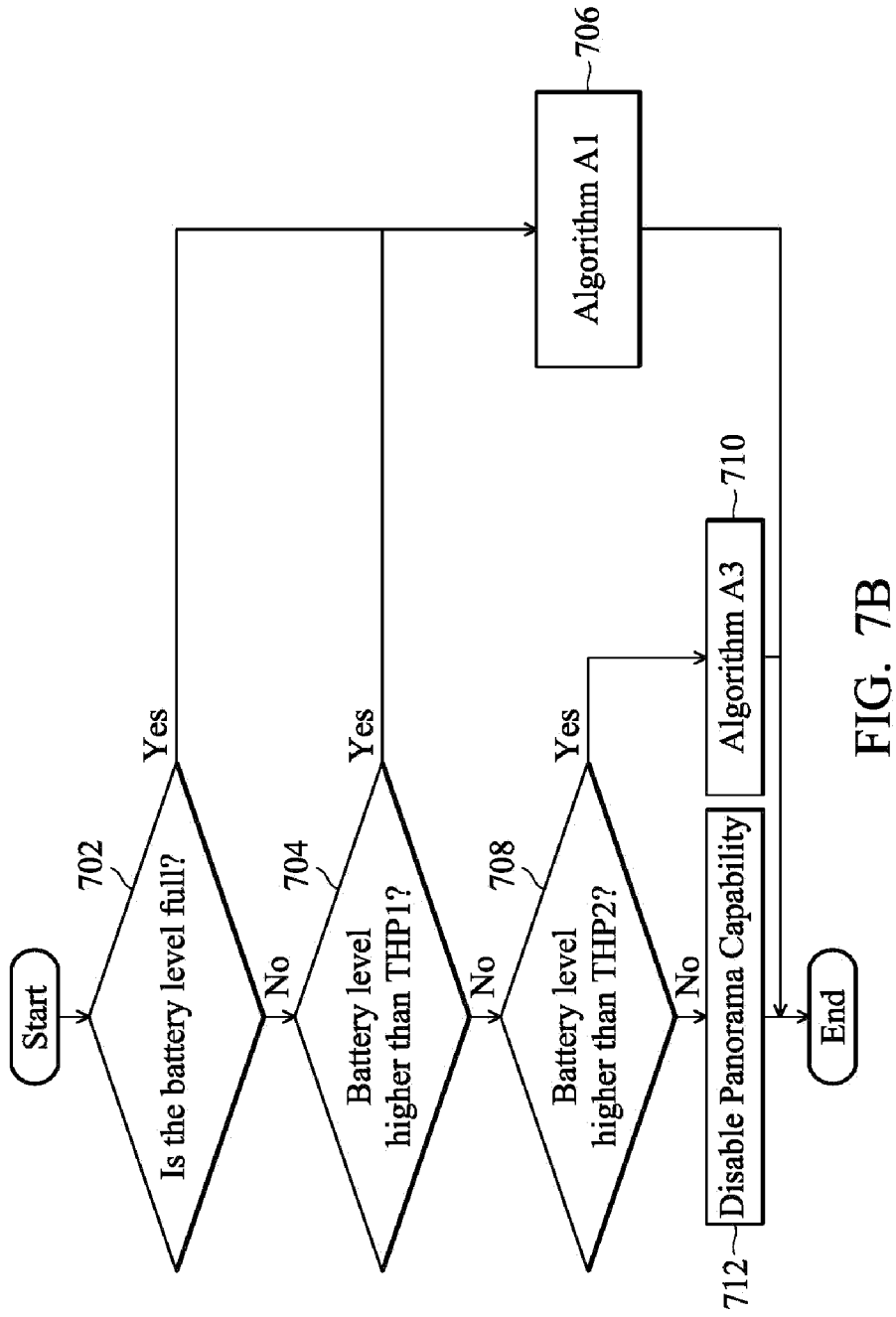
FIG. 7B is a flowchart depicting how to choose the algorithm applied to the adaptive panoramic image processor 106 based on the battery level.

FIG. 7A shows an embodiment that the battery level of the battery 156 may be measured by the battery meter 154 to be compared with threshold values THP1 or THP2. FIG. 7B is a flowchart depicting how to choose the algorithm applied to the adaptive panoramic image processor 106 based on the battery level. When step 702 determines that the battery level is full or step 704 determines that the battery level is not full but higher than the threshold value THP1, step 706 is performed to apply algorithm A1 to the adaptive panoramic image processor 106. When it is determined in step 708 that the battery level is not higher than the threshold value THP1 but is higher than the threshold value THP2, step 710 is performed to apply algorithm A3 to the adaptive panoramic image processor 106. When the battery level is not higher than the threshold value THP2, step 712 is performed to disable the panorama capability of the adaptive panoramic image processor 106. In this manner, the adaptive panoramic image processor 106 provides improved panorama quality (by the more complex algorithm) when the battery level is higher than a threshold value. In some other embodiments, the operations or the order of steps 702-712 may be adjusted, which should not be limited in this disclosure.

Figure 8:
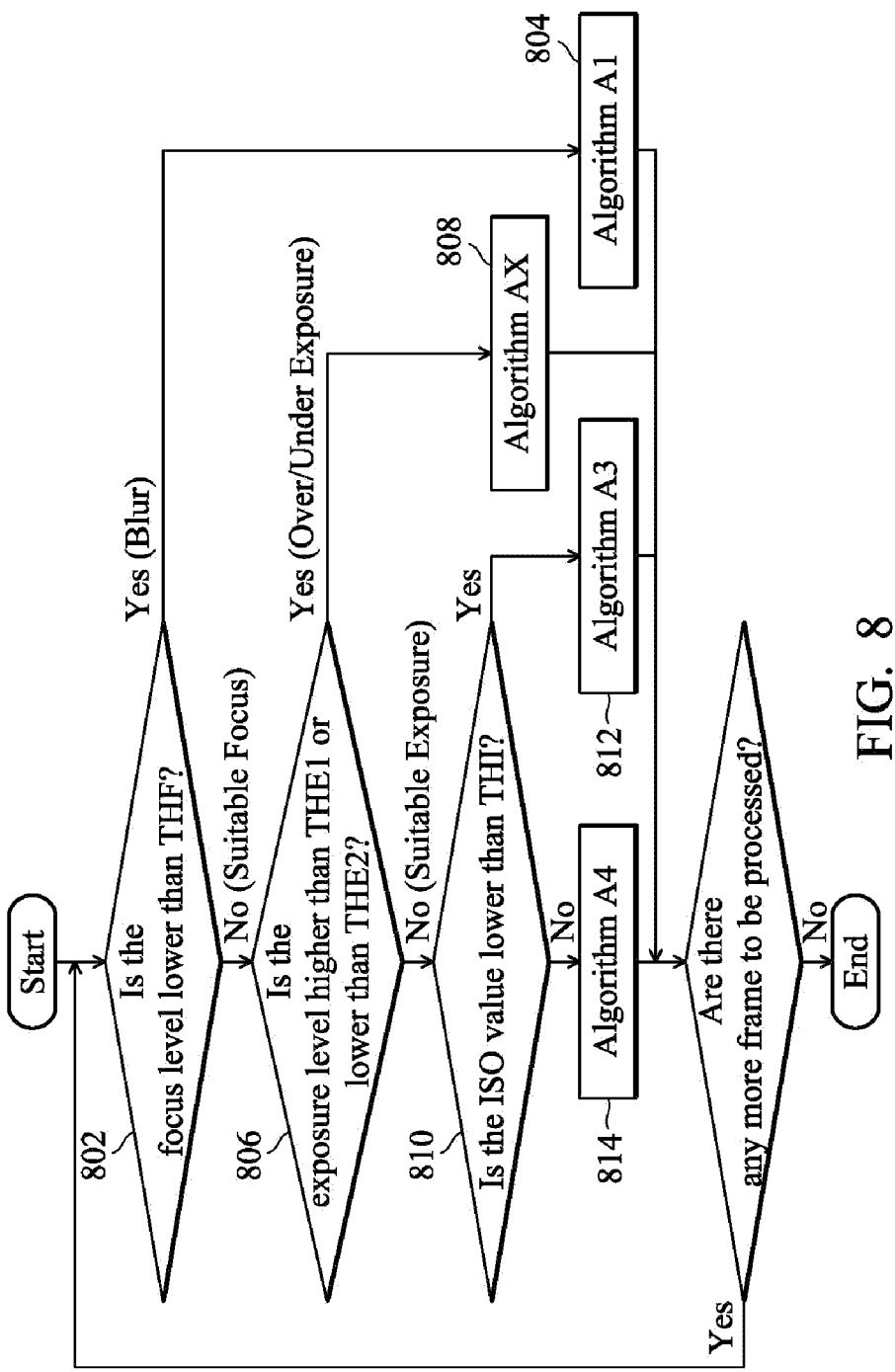
FIG. 8 is a flowchart depicting how to choose the algorithm applied to the adaptive panoramic image processor 106 based on the image signal processing features provided by the image signal processor 108.

FIG. 8 is an embodiment of a flowchart depicting how to choose the algorithm applied to the adaptive panoramic image processor 106 based on the image signal processing features provided by the image signal processor 108. When it is determined in step 802 that a focus level of the captured images is lower than a threshold focus level THF (e.g., which may result in blurred images), step 804 is performed to apply algorithm A1 to the adaptive panoramic image processor 106. When it is determined in step 806 that the images, which have a suitable focus, correspond to an exposure level higher than a threshold exposure level THE1 (e.g., which may result in over exposure) or lower than a threshold exposure level THE2 (e.g., which may result in under exposure), step 808 is performed to apply algorithm AX to the adaptive panoramic image processor 106. When it is determined in step 810 that the images, which have a suitable focus and suitable exposure, correspond to an ISO value lower than a threshold ISO value THI, step 812 is performed to apply algorithm A3 to the adaptive panoramic image processor 106. Otherwise, step 814 is performed to apply algorithm A4 to the adaptive panoramic image processor 106. The steps may be repeated for each frame of a panoramic video file. The algorithm AX is different from algorithm A1 adopted in step 804 and is also different from the algorithms A3 and A4 adopted in steps 812 and 814. The adaptive panoramic image processor 106 uses a more complex algorithm to process (e.g. standardize) the images to form the panorama when the focus level of the images is lower than a threshold focus level, and the more complex algorithm is compared to another algorithm, which is used to process (e.g. standardize) the images to form the panorama when the focus level of the images is at the threshold focus level or greater than the threshold focus level. The adaptive panoramic image processor 106 uses an algorithm AX (different from A1, A3 and A4) to process (e.g. standardize) the images to form the panorama when the exposure level of the images is out of a suitable exposure range. In an exemplary embodiments, the algorithm AX has a more complex design in color processing (compensation for the over/under exposure problems) in comparison with the algorithms A3 and A4 provided for the properly exposed images. The algorithms A3 and A4 provided for the properly exposed images may have more complex designs in image alignment, composition and extraction steps 506. The adaptive panoramic image processor 106 uses a more complex algorithm to process (e.g. standardize) the images to form the panorama when the ISO value of the images is lower than a threshold ISO value, and the more complex algorithm is compared to another algorithm, which is used to process (e.g. standardize) the images to form the panorama when the ISO value of the images is at the threshold ISO value or higher than the threshold ISO value. In some other embodiments, the operations or the order of steps 802-814 may be adjusted, which should not be limited in this disclosure. The complexity of the algorithms applied in steps 804, 808, 812, 814 may be adjusted in some other embodiments, which should not be limited in this disclosure.

Figure 9:
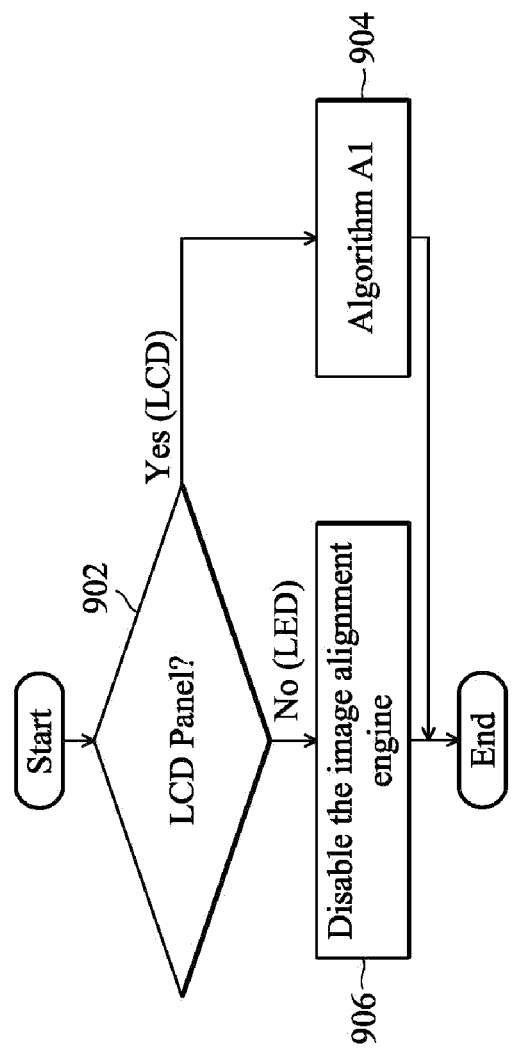
FIG. 9 is a flowchart depicting how to choose the algorithm applied to the adaptive panoramic image processor 106 based on the panel type of a panel of the portable device 100 (e.g. the touch panel 104)

FIG. 9 is an embodiment of a flowchart depicting how to choose the algorithm applied to the adaptive panoramic image processor 106 based on the panel type of a panel of the portable device 100 (e.g. the display unit 104). When it is determined in step 902 that the panel is a liquid-crystal panel, step 904 is performed to apply algorithm A1 to the adaptive panoramic image processor 106. When it is determined in step 902 that the panel is a light-emitting diode panel, step 906 is performed to disable the panorama capability of the adaptive panoramic image processor 106. When the panel is a liquid-crystal panel, the adaptive panoramic image processor 106 may use a more complex algorithm to process (e.g. standardize) the images to form the panorama in comparison with the algorithm, that is used when the panel is a light-emitting diode panel. In some embodiments, it may be because the brightness and contrast of an LED panel are higher than those of an LCD panel. In some embodiments, the adaptive panoramic image processor 106 may use a more complex algorithm to process (e.g. standardize) the images with a high resolution to form the panorama in comparison with the algorithm, that is used to process (e.g. standardize) the images with a low resolution to form the panorama. In some other embodiments, the adaptive panoramic image processor 106 may apply algorithms with different complexities based on any other type of information related to the display unit 104, which should not be limited in this disclosure.

An adaptive panoramic image processor adaptive to an object distance is discussed in this paragraph. Referring to FIG. 4, the proximity sensor 158 senses the distance between the portable device 100 and an object (e.g. a user's face or any other detected object). The adaptive panoramic image processor 106 may provide improved panorama quality (e.g. by a more complex algorithm) when the distance sensed by the proximity sensor 158 is shorter than a threshold distance. The more complex algorithm is compared to another algorithm, which is used to process (e.g. standardize) the images to form the panorama when the distance sensed by the proximity sensor 158 is at the threshold distance or longer than the threshold distance. For example, the smaller object distance, the more aggressive algorithm applied to the image alignment engine of the adaptive panoramic image processor 106. Thus, the panorama quality is guaranteed. The larger object distance, the less aggressive algorithm applied to the image alignment engine of the adaptive panoramic image processor 106. Thus, power consumption is controlled. In another exemplary embodiment, the distance between the portable device 100 and the detected object is estimated from the image(s) captured by the image sensor (any or multiple of IS1 to ISN) rather than the proximity sensor 158.

An adaptive panoramic image processor adaptive to the device temperature is discussed in this paragraph. Referring to FIG. 4, the thermal sensor 160 measures the device temperature. The adaptive panoramic image processor 106 may provide improved panorama quality (e.g. by a more complex algorithm) when the temperature measured by the thermal sensor 160 is lower than a threshold temperature. The more complex algorithm is compared to another algorithm, which is used to process (e.g. standardize) the images to form the panorama when the temperature measured by the thermal sensor 160 is at the threshold temperature or higher than the threshold temperature. For example, the higher device temperature, the less complex (or the lower power) algorithm applied to the adaptive panoramic image processor 106. Thus, the device temperature is controlled. The lower the device temperature, the more complex the algorithm applied to the adaptive panoramic image processor 106. Thus, the panorama quality is guaranteed.

An adaptive panoramic image processor adaptive to the device acceleration is discussed in this paragraph. Referring to FIG. 4, the accelerometer, which is provided by the motion-sensing module 110, measures the device acceleration. The adaptive panoramic image processor 106 may provide improved panorama quality (e.g. by a more complex algorithm) when the acceleration measured by the accelerometer is lower than a threshold acceleration. The more complex algorithm is compared to another algorithm, which is used to process (e.g. standardize) the images to form the panorama when the acceleration measured by the accelerometer is at the threshold acceleration or higher than the threshold acceleration. For example, when the device acceleration is higher than a threshold acceleration, the panoramic results may be bad and the panorama capability of the adaptive panoramic image processor 106 may be disabled. The lower the device acceleration, the more complex the algorithm applied to the adaptive panoramic image processor 106. Thus, the panorama quality is guaranteed. In some other embodiments, when the device acceleration is higher than an upper threshold acceleration, the adaptive panoramic image processor 106 may apply a suitable algorithm since the user may be on a transportation.

An adaptive panoramic image processor adaptive to the device orientation is discussed in this paragraph. Referring to FIG. 4, the gyroscope, which is provided by the motion-sensing module 110, measures the device orientation. The adaptive panoramic image processor 106 uses a more complex algorithm to process (e.g. standardize) the images to form the panorama when the orientation of the portable device is greater than a threshold tilting angle. The more complex algorithm is compared to another algorithm, which is used to standardize the images to form the panorama when the orientation of the portable device is at the threshold tilting angle or smaller than the threshold tilting angle. For example, when the gyroscope detects the portable device 100 is not tilting, the image rotation engine 508 in the adaptive panoramic image processor 106 is disabled to save power. In another exemplary embodiment, the algorithm applied to the adaptive panoramic display processor 120 depends on the device orientation. When the gyroscope detects the portable device 100 is not tilting, an image tracking engine of the adaptive panoramic display processor 120 is disabled to save power. In another exemplary embodiment, the panoramic capability is enabled when the portable device 100 is not tilting and is disabled when the portable device 100 is tilting, which should not be limited in this disclosure.

Figure 10A:
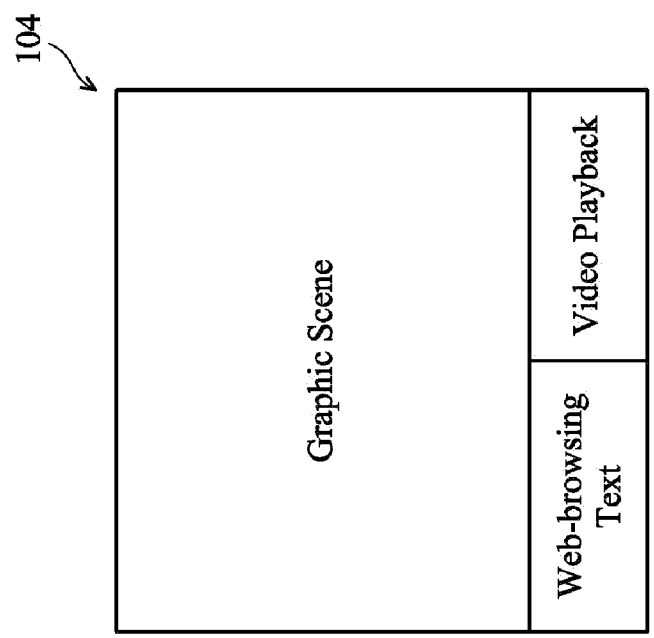
FIG. 10A shows that the display data on the touch panel 104 may have different content classifications.
Figure 10B:
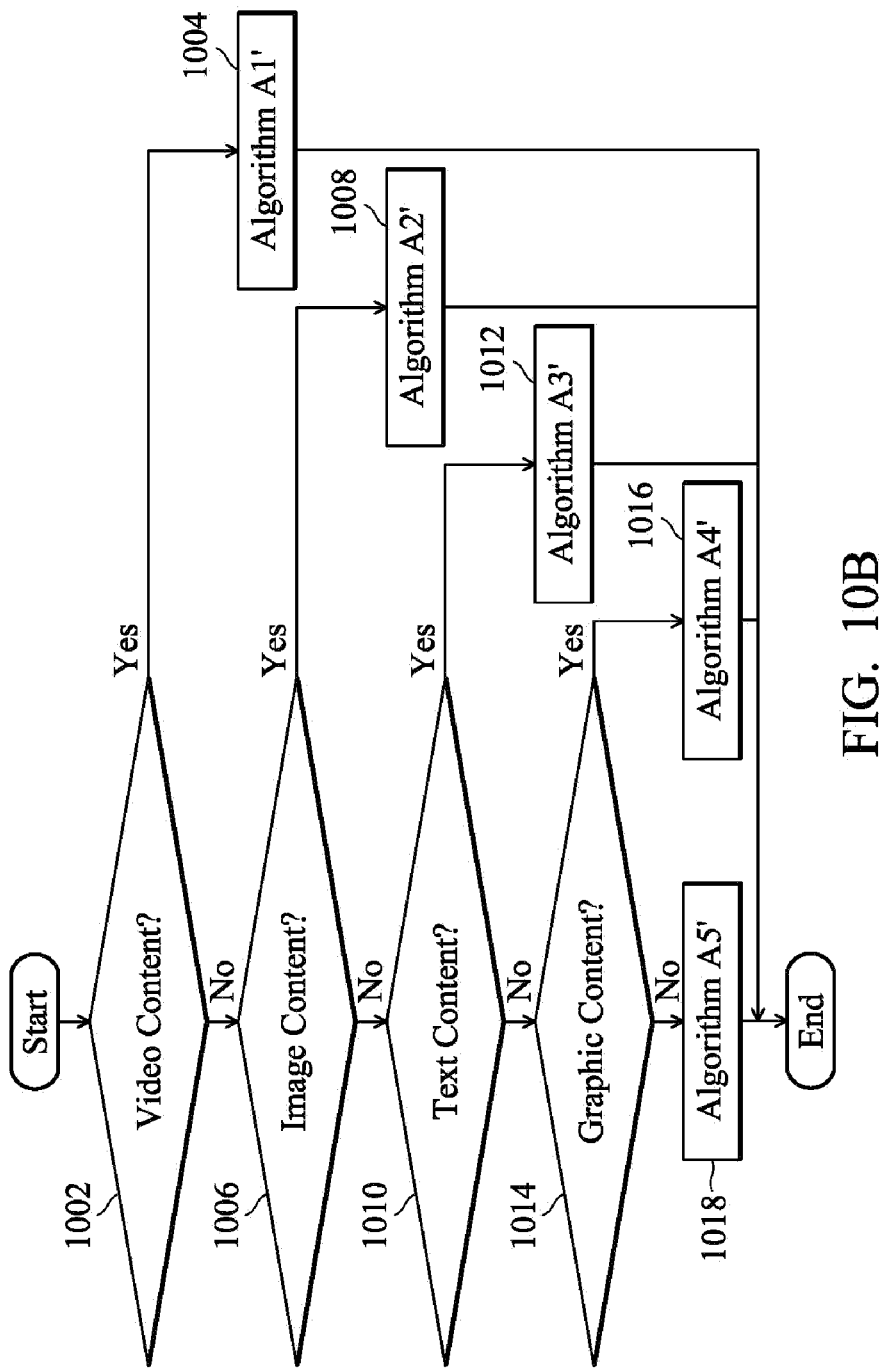
FIG. 10B is a flowchart depicting how to choose the algorithm applied to the adaptive panoramic display processor 120 based on the content classification of display data.

An adaptive panoramic display processor adaptive to the content classification of display data for a trade-off between display quality and system-resource loading is discussed in this paragraph. FIG. 10A shows an embodiment that the display data on the display unit 104 may have different content classifications. The graphic scene, the web-browsing text and the video playback to be displayed on the display unit 104 as shown in FIG. 10A may be separately processed by the adaptive panoramic display processor 120. FIG. 10B is an embodiment of a flowchart depicting how to choose the algorithm applied to the adaptive panoramic display processor 120 based on the content classification of display data. When it is determined in step 1002 that the content classification is representative of video content, step 1004 is performed to operate the adaptive panoramic display processor 120 in accordance with algorithm A1'. When it is determined in step 1006 that the content classification is representative of image content, step 1008 is performed to operate the adaptive panoramic display processor 120 in accordance with algorithm A2'. When it is determined in step 1010 that the content classification is representative of text content, step 1012 is performed to operate the adaptive panoramic display processor 120 in accordance with algorithm A3'. When it is determined in step 1014 that the content classification is representative of graphic content (e.g. GUI), step 1016 is performed to operate the adaptive panoramic display processor 120 in accordance with algorithm A4'. Otherwise, step 1018 is performed to operate the adaptive panoramic display processor 120 in accordance with algorithm A5'. As for a PIP (picture-in-picture) display mode generally used in camera preview, the main content is displayed on a large display area while the sub content is displayed on a small display area. The ROI (region of interest) on the large display area may be different from the ROI on the small display area, In comparison with the panoramic display algorithm applied in displaying panorama on the small display area, a more complex panoramic display algorithm may be applied in displaying panorama on the large display area. In some other embodiments, different algorithms may be applied based on different content classification for, but not limitation, different purposes, which should not be limited in this disclosure.

An adaptive panoramic display processor adaptive to the information detected by a positioning module is discussed in this paragraph. Referring to FIG. 4, the positioning module 118 may detect device position or timing. The adaptive panoramic display processor 120 drives the display unit 104 for panorama display based on the position or timing detected by the positioning module 118. For example, when the detected position or timing indicates that a user of the portable device 100 is at home, the panorama capability of the adaptive panoramic display processor 120 may be enabled. When the detected position or timing indicates that the user of the portable device 100 is at the office, the panorama capability of the adaptive panoramic display processor 120 may be disabled. The algorithm applied to the adaptive panoramic display processor 120 may depend on the user's behavior.

Furthermore, the side information for choosing the algorithm applied to the adaptive panoramic image processor 106 may be also used in choosing the algorithm applied to the adaptive panoramic display processor 120.

A look-up table may be established for choosing the algorithm applied to the adaptive panoramic image processor 106 based on the side information about the portable device 100. Another look-up table may be established for choosing the algorithm applied to the adaptive panoramic display processor 120 based on the aforementioned content classification. In some other embodiments, a look-up table may be provided for choosing the algorithm applied to the adaptive panoramic image processor 106 based on the combination information thereof, which should not be limited in this disclosure.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A portable device, comprising:
a plurality of image sensors configured to have different, but overlapping fields of view;
an input device, receiving a trigger signal that triggers the plurality of image sensors to capture a plurality of images; and
an adaptive panoramic image processor, responsive to the trigger signal to process the plurality of images to form a single panoramic image, wherein the adaptive panoramic image processor is configured to form the single panoramic image by performing an image processing algorithm, selected from a plurality of available image processing algorithms, wherein the performed algorithm is selected based on side information, wherein side information is information used to determine an appropriate image quality versus required resource trade-off associated with the plurality of available image processing algorithms.

2. The portable device as claimed in claim 1, wherein:
the side information comprises information about bandwidth of the portable device; and
the adaptive panoramic image processor provides improved panorama quality when the bandwidth is lower than a threshold bandwidth.

3. The portable device as claimed in claim 2, wherein:
the adaptive panoramic image processor selects, from the plurality of available image processing algorithms, and uses a more complex algorithm to process the images to form the panorama when the bandwidth is lower than the threshold bandwidth; and
the more complex algorithm is compared to another algorithm from the plurality of available image processing algorithms, which is used to process the images to form the panorama when the bandwidth is at the threshold bandwidth or greater than the threshold bandwidth.

4. The portable device as claimed in claim 1, further comprising:
a battery,
wherein:
the side information comprises information about battery level of the battery; and
the adaptive panoramic image processor provides improved panorama quality when the battery level of the battery is higher than a threshold value.

5. The portable device as claimed in claim 4, wherein:
the adaptive panoramic image processor selects, from the plurality of available image processing algorithms, and uses a more complex algorithm to process the images to form the panorama when the battery level of the battery is higher than the threshold value; and
the more complex algorithm is compared to another algorithm from the plurality of available image processing algorithms, which is used to process the images to form the panorama when the battery level of the battery is at the threshold value or lower than the threshold value.

6. The portable device as claimed in claim 1, wherein:
the side information comprises information about image signal processing features of the images; and
the adaptive panoramic image processor is adaptive according to the image signal processing features.

7. The portable device as claimed in claim 6, wherein:
the side information comprises information about a focus level of the images; and
the adaptive panoramic image processor uses a first algorithm, from the plurality of available image processing algorithms, to process the images to form the panorama when the focus level of the images is lower than a threshold focus level; and
the adaptive panoramic image processor uses a second algorithm, from the plurality of available image processing algorithms, which is different from the first algorithm, to process the images to form the panorama when the focus level of the images is at the threshold focus level or greater than the threshold focus level.

8. The portable device as claimed in claim 6, wherein:
the side information comprises information about an exposure level of the images; and
the adaptive panoramic image processor uses a first algorithm, from the plurality of available image processing algorithms, to process the images to form the panorama when the exposure level of the images is out of a suitable exposure range; and
the adaptive panoramic image processor uses a second algorithm, from the plurality of available image processing algorithms, different from the first algorithm, to process the images to form the panorama when the exposure level of the images is within the suitable exposure range.

9. The portable device as claimed in claim 6, wherein:
the side information comprises information about an ISO value of the images; and
the adaptive panoramic image processor uses a first algorithm, from the plurality of available image processing algorithms, to process the images to form the panorama when the ISO value of the images is lower than a threshold ISO value; and
the adaptive panoramic image processor uses a second algorithm, from the plurality of available image processing algorithms, to process the images to form the panorama when the ISO value of the images is at the threshold ISO value or greater than the threshold ISO value.

10. The portable device as claimed in claim 1, further comprising:
a panel, displaying the panorama,
wherein:
the side information comprises information about panel type of the panel; and
the adaptive panoramic image processor is adaptive according to the panel type of the panel.

11. The portable device as claimed in claim 1, further comprising:
a display unit,
wherein:
the side information comprises of information related to the display unit;
the adaptive panoramic image processor applies an algorithms with a suitable complexity to process the images to form the panorama based on the information related to the display unit.

12. The portable device as claimed in claim 1, wherein:
the side information comprises information about a distance between the portable device and an object, and the distance between the portable device and the object is detected by a proximity sensor assembled on the portable device or is estimated from at least one image captured by at least one of the image sensors; and
the adaptive panoramic image processor provides improved panorama quality when the distance sensed by the proximity sensor is shorter than a threshold distance.

13. The portable device as claimed in claim 12, wherein:
the adaptive panoramic image processor selects, from the plurality of available image processing algorithms, and uses a more complex algorithm to process the images to form the panorama when the distance is shorter than the threshold distance; and
the more complex algorithm is compared to another algorithm, selected from the plurality of available image processing algorithms, which is used to process the images to form the panorama when the distance is at the threshold distance or farther than the threshold distance.

14. The portable device as claimed in claim 1, further comprising:
a thermal sensor,
wherein:
the side information comprises information about temperature measured by the thermal sensor; and
the adaptive panoramic image processor provides improved panorama quality when the temperature measured by the thermal sensor is lower than a threshold temperature.

15. The portable device as claimed in claim 14, wherein:
the adaptive panoramic image processor selects, from the plurality of available image processing algorithms, and uses a more complex algorithm to process the images to form the panorama when the temperature measured by the thermal sensor is lower than the threshold temperature; and
the more complex algorithm is compared to another algorithm, selected from the plurality of available image processing algorithms, which is used to process the images to form the panorama when the temperature measured by the thermal sensor is at the threshold temperature or greater than the threshold temperature.

16. The portable device as claimed in claim 1, further comprising:
an accelerometer,
wherein:
the side information comprises information about acceleration measured by the accelerometer; and
the adaptive panoramic image processor provides improved panorama quality when the acceleration measured by the accelerometer is lower than a threshold acceleration.

17. The portable device as claimed in claim 16, wherein:
the adaptive panoramic image processor selects, from the plurality of available image processing algorithms, and uses a more complex algorithm to process the images to form the panorama when the acceleration measured by the accelerometer is lower than the threshold acceleration; and
the more complex algorithm is compared to another algorithm, selected from the plurality of available image processing algorithms, which is used to process the images to form the panorama when the acceleration measured by the accelerometer is at the threshold acceleration or greater than the threshold acceleration.

18. The portable device as claimed in claim 1, further comprising:
a gyroscope, measuring orientation of the portable device,
wherein:
the side information comprises information about the orientation of the portable device;
the adaptive panoramic image processor uses a first algorithm, from the plurality of available image processing algorithms, to process the images to form the panorama when the orientation of the portable device is greater than a threshold tilting angle; and
the adaptive panoramic image processor uses a second algorithm, from the plurality of available image processing algorithms, different from the first algorithm, to process the images to form the panorama when the orientation of the portable device is at the threshold tilting angle or smaller than the threshold tilting angle.

19. The portable device as claimed in claim 1, further comprising:
an adaptive panoramic display processor and a display unit,
wherein:
the adaptive panoramic display processor drives the display unit for panorama display based on content classification of display data.

20. The portable device as claimed in claim 19, wherein:
when the content classification is representative of video content, the adaptive panoramic display processor is operated in accordance with a first algorithm, from the plurality of available image processing algorithms;
when the content classification is representative of image content, the adaptive panoramic display processor is operated in accordance with a second algorithm, from the plurality of available image processing algorithms; and
the first algorithm is different from the second algorithm.

21. The portable device as claimed in claim 20, wherein:
when the content classification is representative of text content, the adaptive panoramic display processor is operated in accordance with a third algorithm, from the plurality of available image processing algorithms;
the third algorithm is different from the first or second algorithms.

22. The portable device as claimed in claim 21, wherein:
when the content classification is representative of graphic content, the adaptive panoramic display processor is operated in accordance with a fourth algorithm, from the plurality of available image processing algorithms;
the fourth algorithm is different from the first, second or third algorithms.

23. The portable device as claimed in claim 1, further comprising:
- a display unit;
- an adaptive panoramic display processor; and
- a positioning module, wherein:
- the adaptive panoramic display processor drives the display unit for panorama display based on position or timing detected by the positioning module.

24. The portable device as claimed in claim 23, wherein:
- when the position or timing detected by the positioning module indicates that a user of the portable device is at home, a panorama capability of the adaptive panoramic display processor is enabled; and
- when the position or timing detected by the positioning module indicates that the user of the portable device is at work, the panorama capability of the adaptive panoramic display processor is disabled.

* * * * *